US011118533B1

(12) United States Patent
Anders et al.

(10) Patent No.: US 11,118,533 B1
(45) Date of Patent: Sep. 14, 2021

(54) PISTON FOR INTERNAL COMBUSTION ENGINE HAVING CONGRUOUS COMBUSTION BOWL AND GALLERY SURFACES AND METHOD OF MAKING THE SAME

(71) Applicant: Caterpillar Inc., Peoria, IL (US)

(72) Inventors: Jonathan William Anders, Peoria, IL (US); Naga Krishna Chaitanya Kavuri, Peoria, IL (US); Bobby John, Peoria, IL (US); Hyderuddin Mohammad, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/889,969

(22) Filed: Jun. 2, 2020

(51) Int. Cl.
*F02F 3/28* (2006.01)
*F02F 3/20* (2006.01)

(52) U.S. Cl.
CPC . *F02F 3/28* (2013.01); *F02F 3/20* (2013.01)

(58) Field of Classification Search
CPC ....... F02F 3/28; F02F 3/26; F02F 3/20; F02B 23/06; F02B 23/0645; F02B 23/0669; F02B 23/0678; F02B 23/0672; F02B 23/0696; F16J 1/00; F16J 1/08; F16J 1/09; F01P 3/06; F01P 3/10
See application file for complete search history.

(56) References Cited

U.S. PATENT DOCUMENTS

| | | | |
|---|---|---|---|
| 8,459,229 B2 | 6/2013 | Rothbauer et al. | |
| 8,528,206 B2* | 9/2013 | Scharp | B21K 1/185 29/888.047 |
| 9,334,958 B2 | 5/2016 | Schneider | |
| 10,294,888 B2* | 5/2019 | Zhang | F02F 3/28 |
| 10,400,663 B2* | 9/2019 | Ness | F02B 23/08 |
| 2015/0176524 A1* | 6/2015 | Linke | F02F 3/22 123/193.6 |
| 2016/0305365 A1* | 10/2016 | Schneider | F02F 3/0084 |
| 2019/0003372 A1 | 1/2019 | Eismark | |

FOREIGN PATENT DOCUMENTS

| | | | |
|---|---|---|---|
| EP | 3517754 A1 | 7/2019 | |
| JP | 6481968 B2 | 3/2019 | |
| JP | 6508236 B2 | 5/2019 | |

* cited by examiner

*Primary Examiner* — Grant Moubry
(74) *Attorney, Agent, or Firm* — Brannon Sowers & Cracraft

(57) ABSTRACT

A piston for an internal combustion engine includes a piston having a bowl surface forming a combustion bowl, a rim surface forming an annular rim, and a gallery surface exposed to a backside cooling gallery of the piston. The bowl surface forms a bowl profile varied circumferentially around a piston center axis, and the gallery surface forms a gallery profile that is varied circumferentially around the piston center axis and is congruous with the bowl profile. The gallery surface is concave to the combustion bowl, convex to the backside cooling gallery, and forms no edges exposed within the backside cooling gallery. A wall formed between the combustion bowl and the backside cooling gallery has a heat-dissipation wall thickness defined by the varied bowl profile and the varied gallery profile.

18 Claims, 3 Drawing Sheets

PISTON FOR INTERNAL COMBUSTION ENGINE HAVING CONGRUOUS COMBUSTION BOWL AND GALLERY SURFACES AND METHOD OF MAKING THE SAME

TECHNICAL FIELD

The present disclosure relates generally to a piston, and more particularly to a piston having congruous bowl and gallery profiles.

BACKGROUND

A great many different operating strategies and component designs are known in the field of internal combustion engines. Research and development has progressed for decades in relation to the manner in which factors such a fueling, exhaust gas recirculation or EGR, turbocharging, variable valve actuation, variable geometry turbines, use of waste gates, and a host of others can be varied to produce different results. In addition to varying these and other operating parameters, a great deal of research and performance testing effort has centered around different ways that engine components, notably pistons in recent years, can be shaped and proportioned to achieve a range of desired outcomes. One motivation driving advancements in combustion science has been the desire to reduce and/or balance relative amounts of certain emissions in engine exhaust, including particulate matter such as soot and oxides of nitrogen or NOx, without unduly impacting other parameters such as fuel efficiency, and component wear and/or fatigue.

Decades of combustion science, materials, and mechanical engineering research has revealed generally that factors such as emissions and efficiency can be affected significantly and often unpredictably by seemingly minor changes in component design or operating parameters. For this reason, designs and strategies purpose-built for one application may reveal themselves to be less well-suited to others. U.S. Pat. No. 8,978,621 to Easley et al. is directed to a piston having a combustion bowl shaped to balance combustion efficiency and emissions properties. The Easley disclosure proposes a piston having features stated to together desirably affect emissions such as particulate matter and NOx without unduly sacrificing fuel efficiency.

SUMMARY OF THE INVENTION

In one aspect, a piston for an internal combustion engine includes a piston skirt, and a piston crown attached to the piston skirt and defining a piston center axis. The piston crown includes a bowl surface forming a combustion bowl, a rim surface forming an annular rim extending circumferentially around the combustion bowl, and a gallery surface exposed to a backside cooling gallery of the piston. The bowl surface includes an outer bowl surface that is concave to the combustion bowl, and forms a bowl profile that is varied circumferentially around the piston center axis, such that the bowl surface defines, within the combustion bowl, a plurality of bowl peak points and a plurality of bowl valley points. The gallery surface is concave to the combustion bowl and convex to the backside cooling gallery, and forms a gallery profile that is varied, congruously with the bowl profile, circumferentially around the piston center axis.

In another aspect, a piston for an internal combustion engine includes a piston body defining a piston center axis extending between a first axial piston body end and a second axial piston body end. The first axial piston body end includes a bowl surface forming a combustion bowl, a rim surface forming an annular rim extending circumferentially around the combustion bowl, and a gallery surface exposed to a backside cooling gallery of the piston. The bowl surface includes an outer bowl surface that is concave to the combustion bowl, and forms a bowl profile that is varied circumferentially around the piston center axis, such that the bowl surface defines, within the combustion bowl, a plurality of bowl peak points and a plurality of bowl valley points. The gallery surface is concave to the combustion bowl and convex to the backside cooling gallery, and forms a gallery profile that is varied circumferentially around the piston center axis, such that the gallery surface defines, within the backside cooling gallery, a plurality of gallery peak points and a plurality of gallery valley points.

In still another aspect, a method of making a piston for an internal combustion engine includes forming, in a piston body defining a center axis, a combustion bowl and an annular rim extending circumferentially around the combustion bowl, and forming, in the piston body, a backside cooling gallery. The method further includes profiling the combustion bowl, circumferentially around the center axis, such that a bowl surface concave to the combustion bowl defines bowl peak points and bowl valley points, and profiling the backside cooling gallery, circumferentially around the center axis, such that a gallery surface defines gallery peak points and gallery valley points. The method still further includes limiting hot spot formation locations in the piston at least in part by shaping the gallery surface, in a circumferential aspect, such that a profile formed by the gallery surface is congruous with a profile formed by the bowl surface, and shaping the gallery surface, in an axial aspect, such that the gallery surface has a curvature that is concave to the combustion bowl and convex to the backside cooling gallery.

DETAILED DESCRIPTION

Figure 1:
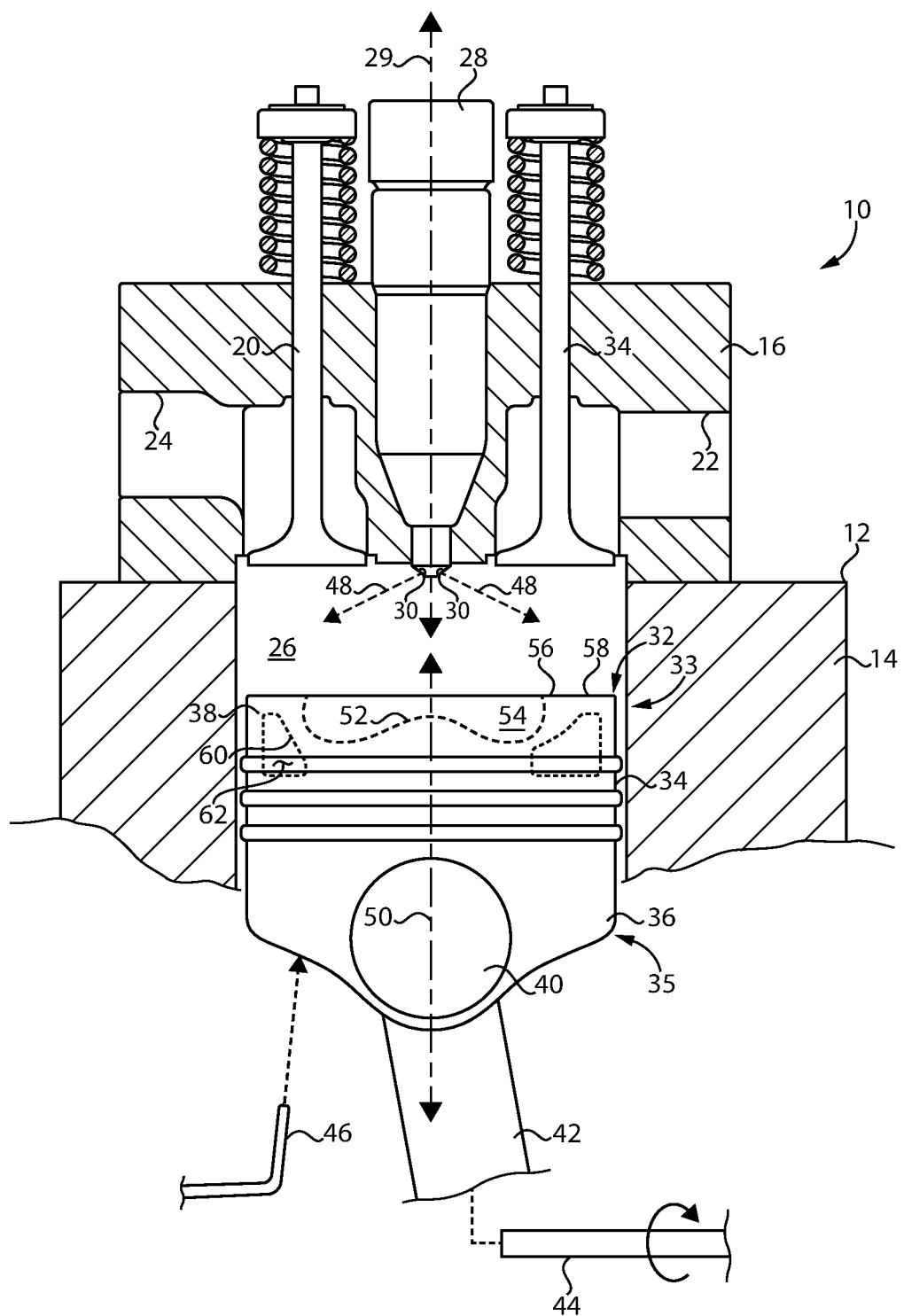
FIG. 1 is partially sectioned side diagrammatic view of an engine, according to one embodiment.

Referring to FIG. 1, there is shown an internal combustion engine 10 according to one embodiment, and including an engine housing 12 having a cylinder block 14 and an engine head 16 attached to cylinder block 14. A first gas exchange valve 18 and a second gas exchange valve 20 are supported in engine head 16 and movable to open and close a first gas exchange conduit 22 and a second gas exchange conduit 24, respectively. First gas exchange valve 18 might include an intake valve and second gas exchange valve 20 might include an exhaust valve, each might be an exhaust valve, or each might be an intake valve. A combustion cylinder 26 is formed in cylinder block 14 and may include one of a plurality of combustion cylinders in any suitable arrangement such as a V-pattern, an in-line pattern, or still another. Internal combustion engine 10 further includes a fuel injector 28 supported in engine housing 12, and mounted in engine head 16 for direct injection of a fuel into combustion cylinder 26. Fuel injector 28 defines an injector axis 29, and has a plurality of spray orifices 30 formed therein and positioned within combustion cylinder 26. Spray orifices 30 define a plurality of spray plume paths 48 that advance radially outward and axially outward into combustion cylinder 26 relative to injector axis 29. "Axially outward" means away from a centerpoint of a line segment of an axis, whereas axially inward has an opposite meaning. Thus, "axially outward" in reference to fuel injector 26 would mean away from a geometric centerpoint of a line segment of injector axis 28 defined by a full axial length of fuel injector 28. "Radially inward" and "radially outward" are terms used conventionally herein.

A piston 32, including a piston body 34, is positioned at least partially within combustion cylinder 26, and defines a piston center axis 50 extending between a first axial piston body end 33 and a second axial piston body end 35. Piston 32 includes a piston skirt 36 having a wrist pin 40 supported for rotation therein, and coupled with a connecting rod 42 operable to rotate a crankshaft 44 in response to movement of piston 32, between a bottom-dead-center position, and a top-dead-center position, in a generally conventional manner. Internal combustion engine 10 may include a compression ignition engine structured to operate on a diesel fuel, such as a diesel distillate fuel. Piston 32 may be operable to compress a mixture of air and fuel, optionally including recirculated exhaust gas, to an autoignition threshold in a compression stroke according to a four-cycle pattern. In other embodiments internal combustion engine 10 could be a dual-fuel engine, operate in a two-stroke cycle, or have still other operating properties or configurations. An oil spray conduit 46 is shown positioned beneath piston 32 and sprays engine oil to an underside of piston 32 to cool piston 32. Piston 32 also includes a piston crown 38 attached to piston skirt 36 and defining a piston center axis 50. Piston crown 38 includes a bowl surface 52, upon first axial piston body end 33, forming a combustion bowl 54. Piston crown 38 also includes a rim surface 56 forming an annular rim 58 extending circumferentially around combustion bowl 54, and a gallery surface 60 exposed to a backside cooling gallery 62 of piston 32.

Figure 2:
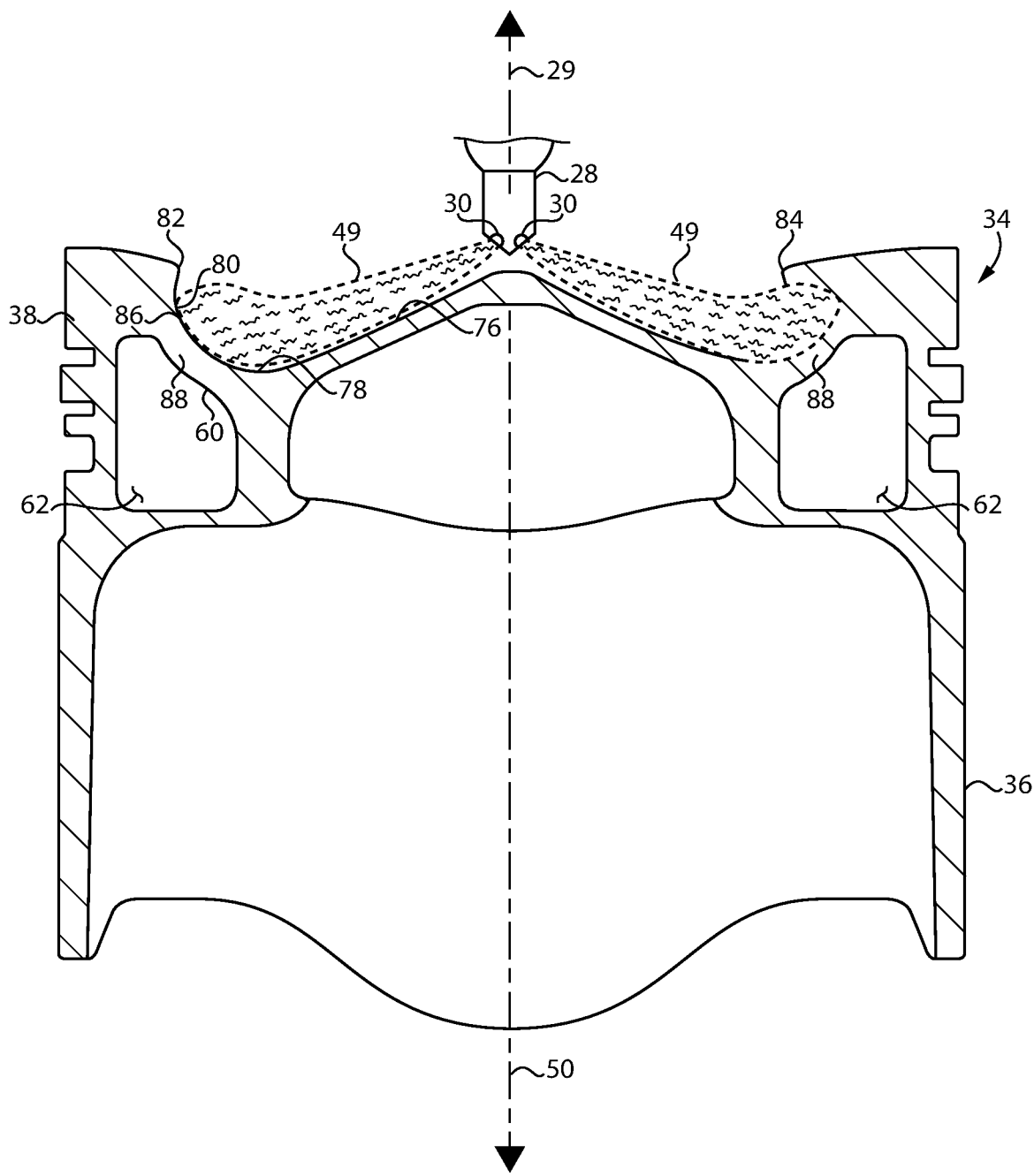
FIG. 2 is a sectioned side diagrammatic view of a piston in combination with a fuel injector.

Referring also now to FIG. 2, bowl surface 52 includes a center cone surface 76 that is convex to combustion bowl 54, a floor surface 78, and an outer bowl surface 80 extending between floor surface 78 and annular rim 58. Outer bowl surface 80 is concave to combustion bowl 54. Those skilled in the art will recognize combustion bowl 54 as having a reentrant shape. A combustion bowl edge 82 forms a transition between rim surface 56 and outer bowl surface 80. In the illustrated embodiment, gallery surface 60 is opposite to outer bowl surface 80, meaning the respective surfaces are upon opposite sides of a common wall. Gallery surface 60 is concave to combustion bowl 54 and convex to backside cooling gallery 62. Gallery surface 60 may further be understood to have a curvature that is concave to combustion bowl 54, and forms no edges, protrusions, ridges, or other surface features exposed to backside cooling gallery 54 but instead is smoothly curving, the significance of which will be further apparent from the following description.

Figure 6:
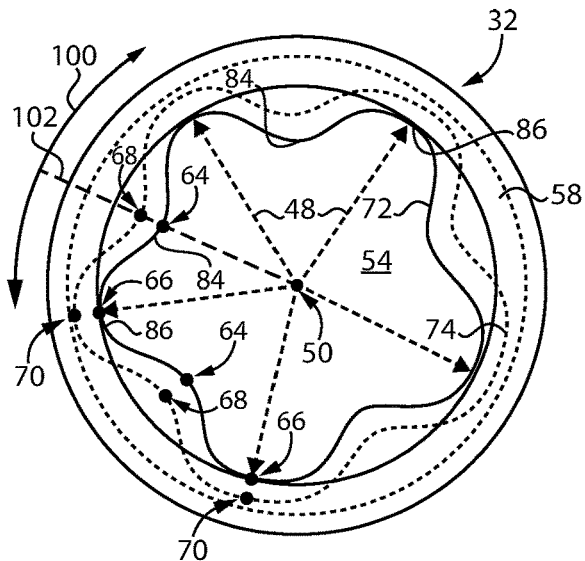
FIG. 6 is a top diagrammatic view of a piston, according to one embodiment.

Referring also now to FIG. 6, bowl surface 52 forms a bowl profile 72 that is varied circumferentially around piston center axis 50, such that bowl surface 52 defines, within combustion bowl 54, a plurality of bowl peak points 64 and a plurality of bowl valley points 66. Gallery surface 60 forms a gallery profile 74 that is varied circumferentially around piston center axis 50, congruously with the bowl profile, and such that gallery surface 60 defines, within backside cooling gallery 62, a plurality of gallery peak points 68 and a plurality of gallery valley points 70.

It will be recalled that spray orifices 30 define plume paths 48 that advance radially outward and axially outward into combustion cylinder 26. In the illustrated embodiment, plume paths 48 extend from the respective one of spray orifices 30 toward certain targeted locations within combustion bowl 54, which may include bowl valley points 66. Also in the illustrated embodiment, outer bowl surface 80 forms radially inward bowl peaks 84, or ridges, that include the plurality of bowl peak points 64, and radially outward bowl valleys 86 that include the plurality of bowl valley points 66. Bowl peak points can be understood to be formed along an entirety of bowl peaks 84 extending into combustion bowl 54 from edge 82 in the illustrated embodiment. Analogously, bowl valley points are formed along an entirety of bowl valleys 86 extending into combustion bowl 52 from edge 82. Other bowl shapes and features will be apparent that can be understood to each define one or more peak points, or one or more valley points. For instance, protrusions having shapes other than ridges could be understood to define one or more peak points. Indentations other than valleys may be understood to define valley points. Radially outward bowl valleys 86 are in an alternating arrangement with radially inward bowl peaks 84 in the illustrated embodiment, FIG. 6, and radially inward bowl peaks 84 are arranged in a radially symmetric pattern. Each of radially inward bowl peaks 84 may also include a single protruding ridge formed between two adjacent radially outward valleys 86, and extending from floor surface 78 to combustion bowl edge 82. Radially inward bowl peaks as contemplated herein could have multiple parallel ridges or complex structures with numerous ridges or isolated peaks formed by a contour of a bowl surface. Valleys could analogously have relatively simpler or more complex structures.

In FIG. 2, piston 34 is shown near fuel injector 28 as it might appear approximately at a top-dead-center position in combustion cylinder 26. A spray plume 49 advancing outwardly from the left-hand one of spray orifices 30 can be seen to advance into a radially outward bowl valley 86. A spray plume 49 advancing from the right-hand spray orifice 30 in FIG. 2 is in front of a radially inward bowl peak 84. The illustrated arrangement, in which spray plume paths 48 each extend from respective ones of spray orifices 30 into one of radially outward bowl valleys 86, contrasts with certain other piston designs in internal combustion engines where spray plumes are targeted directly, or nearly, at protruding surface features. It can also be noted from FIG. 6, for example, that a number of radially inward bowl peaks 84 is 5, and a number of radially outward bowl valleys 80 is also 5. In other embodiments the number of radially inward bowl peaks and the number of radially outward bowl valleys might be greater than 5 or less than 5, for example, from 3 to 8, as further discussed herein. The number of bowl peaks and bowl valleys will typically, but not necessarily, be the same as a number of spray orifices in an associated fuel injector. Certain known pistons also have cooling gallery geometry that can actually intensify heat dissipation concerns, for example, relatively sharp edges or thin sections of material that result from the manufacturing processes that are employed, such as turning or other machining techniques. As noted above, and as further discussed below, piston 52 may be free of such features within backside cooling gallery 62.

It will also be recalled that bowl profile 72 and gallery profile 74 are congruous. This can be understood to mean generally that accordance in shape of the two profiles exists, but not necessarily that perfect or even substantial agreement between the respective bowl profile 72 and gallery profile 74 is required. A concave profile and a convex profile are likely not congruous with one another. A first profile that is concave in a first direction is likely not congruous with a second profile that is concave in a second, opposite direction. According to some combustion strategies, heat dissipation challenges, resulting ultimately in a piston that risks becoming too hot or has hot spots, can be encountered where certain bowl geometries are combined with conventional cooling oil gallery profiles in a piston. In engines utilizing such pistons, operation may be sub-optimal with respect to emissions, efficiency, or both, in an effort to avoid excessive piston temperature conditions. Pistons in many types of engines have traditionally included a backside surface exposed to a cooling oil gallery. The shapes of such galleries are not generally contoured in conformity with a bowl surface or are simply matched in contour to a uniform bowl surface, nor do they take account of the specific temperature conditions of the in-cylinder environment. Stated another way, existing pistons typically provide a cooling oil gallery shape that is not designed in view of combustion strategy and/or varied, non-uniform bowl geometry. As a result, a thickness of material by which heat of combustion is dissipated from a combustion bowl to cooling oil varies in a manner that can produce hot spot locations or otherwise negatively impact performance. As further discussed herein, piston 32 may be structured to limit hot spot formation locations based on the shape and manner of making piston 32.

Figure 3:
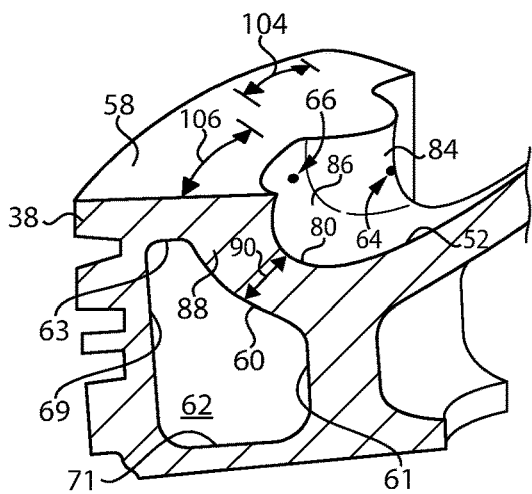
FIG. 3 is a sectioned view, in perspective, of a portion of a piston, according to one embodiment.
Figure 4:
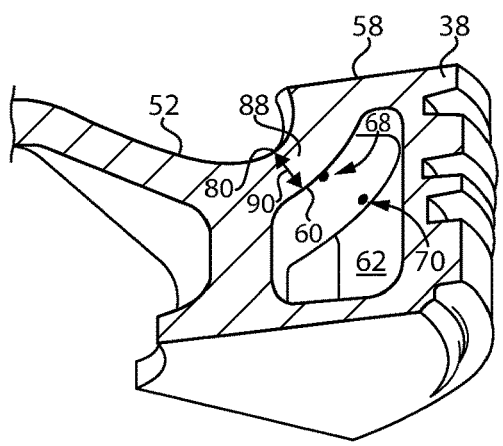
FIG. 4 is another sectioned view, in perspective, of a portion of a piston, according to one embodiment.
Figure 5:
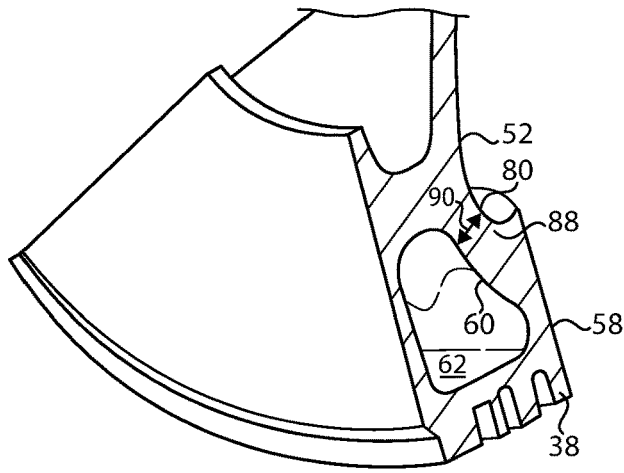
FIG. 5 is yet another sectioned view, in perspective, of a portion of a piston, according to one embodiment.

Referring also now to FIGS. 3-5, in piston 32 a wall 88 is formed between combustion bowl 54 and backside cooling gallery 62. Wall 88 has a heat-dissipation wall thickness 90 defined by varied bowl profile 72 and varied gallery profile 74. Wall thickness 90 can vary, or be uniform, around piston center axis 50, but will generally vary less than the varying in shape of combustion bowl 54. In a practical implementation strategy, bowl profile 72 is varied in a first periodic pattern circumferentially around piston center axis 50, and gallery profile 74 is varied in a second periodic pattern circumferentially around piston center axis 50 that is in phase with the first periodic pattern. It can be seen from the example of FIG. 6 that bowl peak points 64 are in circumferential alignment with gallery peak points 68, and that bowl valley points 66 are in circumferential alignment with gallery valley points 70. A circle 100, an arc of which is shown in FIG. 6, is centered on piston center axis 50 and defines a radius line 102 that overlies, in an axial projection plane, one bowl peak point 64 and one gallery valley point 68.

In other instances, a periodic pattern of varying bowl profile might be out of phase with a periodic pattern of varying gallery profile, but the respective profiles still considered congruous. Where a varying periodic pattern of bowl profile and a varying periodic pattern of gallery profile are 180° out of phase, the respective profiles would likely not be considered congruous. As depicted in FIGS. 3-5, the shape and contouring of gallery surface 60 and bowl surface 52 may be circumferentially congruous or congruous in a circumferential aspect and axially congruous or congruous in an axial aspect. At least portions of bowl surface 52 and gallery surface 60, in particular outer bowl surface 80 and gallery surface 60, will be understood to run generally in parallel circumferentially around piston center axis 50, and also generally in parallel vertically or axially up and down. It can also be seen from FIG. 3 that a circumferential extent of a radially outward bowl valley 86 is shown at reference numeral 106, and a circumferential extent of a radially inward bowl peak 84 is shown at 104. Circumferential extent 106 may be larger than circumferential extent 104, although the present disclosure is not thereby limited. Each of radially outward bowl valleys 86 and radially inward bowl peaks 84 may have rounded or curvilinear profiles in an axial view or axial section plane as in FIG. 6. Thus, bowl valleys 84 may have curvilinear profiles between adjacent bowl peaks 84, and bowl peaks 84 may have curvilinear profiles between adjacent bowl valleys 86. The present disclosure is also not limited in such regard and planar surface shapes might be employed in some instances.

It can also be seen from FIGS. 3-5 that piston 32 includes an inner wall surface 61, a roof surface 63, an outer wall surface 69, and a floor surface 71, forming, together with gallery surface 60, backside cooling gallery 62. Roof surface 63 and floor surface 71 may be planar, and vary in width with the varying of the gallery profile circumferentially around piston center axis 50. Inner wall surface 61 and outer wall surface 69 may face radially outward and radially inward directions, respectively, with outer wall surface 69 being cylindrical and inner wall surface varying with the varying of the gallery profile. Gallery surface 60 extends from inner wall surface 61 to roof surface 63, and each of gallery surface 60, inner wall surface 61, and roof surface 63 is circumferentially continuous around piston center axis 50. It can also be seen from FIGS. 3-5 that gallery surface 60 is continuously concave, in an axial aspect, from inner wall surface 61 to roof surface 63. Gallery surface 60 may be smoothly curved in a circumferential aspect and smoothly curved in an axial aspect, such that gallery surface 60 is free of edges, ridges, protrusions, or other features exposed within backside cooling gallery 62 that can serves as locations where hot spots tend to be produced.

Figure 7:
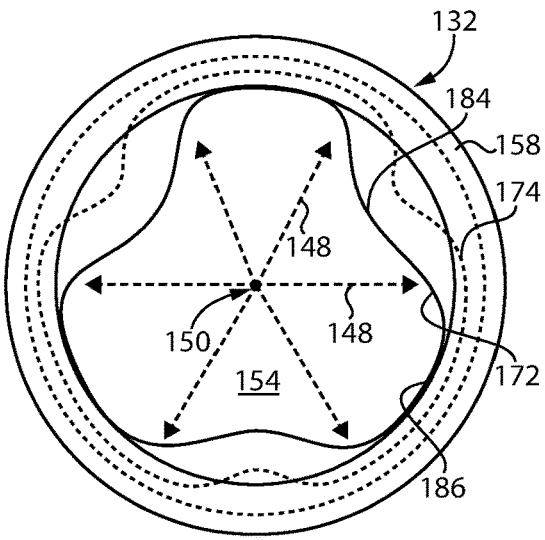
FIG. 7 is a top diagrammatic view of a piston according to another embodiment.

Referring now to FIG. 7, there is shown another piston 132 according to one embodiment, and including a combustion bowl 154 and an annular rim 158 extending circumferentially around combustion bowl 154. A piston center axis is shown at 150 and spray plume paths 148 advance radially outward, and axially outward, analogous to spray plume paths 48, to target valleys 186 in combustion bowl 154. Valleys 186 are in an alternating arrangement with peaks 184, with a bowl profile shown at 172 and a gallery profile shown at 174. In contrast to the foregoing embodiment, in piston 132 a total of six spray plume paths 148, corresponding to a total of six spray orifices in an associated fuel injector, are shown. Piston 132 includes a total of three radially inward peaks 184, and a total of three radially outward valleys 186. It can be seen that two spray plume paths 148 are targeted into each one of radially outward valleys 186. It can also be noted that spray plume paths 148 are not targeted toward a center point of the respective valleys 186, but instead to the sides of what would be understood as center points of valleys 186. In still other embodiments, rather than spray plumes emanating from a location centered relative to a piston, fuel injectors and pistons could be configured with spray orifices offset from a piston center axis.

INDUSTRIAL APPLICABILITY

Referring to the drawings generally, operating internal combustion engine 10 can include moving piston 32 between a bottom-dead-center position and a top-dead-center position, to execute a conventional four-cycle operating pattern, including compression strokes to compress a mixture of air and injected fuel to an autoignition threshold. Typically just prior to piston 32 reaching a top-dead-center position, fuel injector 28 can be operated to inject a liquid fuel into combustion cylinder 26, such that fuel spray plumes 49 enter combustion bowl 54, advancing along center cone surface 76, and then turning upward along outer bowl surface 80. It is believed that radially inward peaks 84 can assist in maintaining some separation of plumes 49 from one another, thereby avoiding early plume-to-plume interaction and optimizing use of available oxygen for combustion. A piston 32 continues to or slightly past its top-dead-center position, fuel injection is ended. The combustion of fuel produces a rapid pressure and temperature rise in cylinder 26, and transferring heat energy from the combustion gases to metallic material of piston 52, and typically especially to surfaces exposed directly to combusting plumes 49.

Heat energy transferred to material of piston 32 will be dissipated through wall 90 to a continuous spray of cooling oil sprayed to the underside of piston 32 by way of oil spray conduit 46. Based upon the congruous bowl and gallery profiles providing a uniform wall thickness 90, or a wall thickness of relatively reduced non-uniformity as compared to a gallery surface not varied in profile, especially at locations experiencing high heat inputs, overheating or concentrated hot spots in piston 32 will be absent or risks much reduced, as compared to conventional piston geometries.

As can be seen from FIGS. 3-5, heat-dissipation wall thickness 90 may have a minimum value at a location that is axially between roof surface 63 and inner wall surface 61, of backside cooling gallery 62, for example at a location along gallery surface 60 that is approximately half-way between inner wall surface 61 and roof surface 63. Heat-dissipation wall thickness 90 may have progressively increased values from the location of the minimum value to roof surface 63 and from the location of the minimum value to inner wall surface 61. In other words, heat-dissipation wall thickness 90 may be nowhere less than at a location approximately half-way along a running length of gallery surface 60, in an axial section plane, between inner wall surface 61 and roof surface 63.

Making piston 32 can include forming, in piston body 34, combustion bowl 54 and annular rim 58 extending circumferentially around combustion bowl 54, and forming, in piston body 34, backside cooling gallery 62. Piston 32 can be made by an additive manufacturing process, such as a suitable 3D printing process. By way of additive manufacturing, machining techniques, or other suitable techniques, combustion bowl 54 can be profiled, circumferentially around piston center axis 50, such that bowl surface 52 defines bowl peak points and bowl valley points as discussed herein, and backside cooling surface 60 can be profiled, circumferentially around center axis 50, such that gallery surface 60 defines gallery peak points and gallery valley points.

As discussed above, it has been observed that features such as varying thicknesses, edges formed from overlapping machining cuts, ridges, thing walled sections, and other geometric properties of pistons relative to a combustion bowl and a backside cooling gallery can be locations susceptible to the formation of hot spots where piston temperature is locally greater and above a desired threshold as compared to other material of the piston. According to the present disclosure, and in making piston 32 hot spot formation locations can be limited by shaping gallery surface 60, in a circumferential aspect, such that a gallery profile formed by gallery surface 60 is congruous with a bowl profile formed by bowl surface 52. Limiting hot spot formation locations in the making of piston 32 can further include shaping gallery surface 60, in an axial aspect, such that gallery surface 60 has a curvature that is concave to combustion bowl 52 and convex to backside cooling gallery 62. It will also be recalled that gallery surface 60 may be shaped, in making piston 32, in the axial aspect, such that gallery surface 60 is smoothly curved from inner wall surface 61 to roof surface 63, and forms no edges exposed within backside cooling gallery 62. In other words, a desired smoothly curving geometry, both in an axial direction and in a circumferential direction, as can be seen in FIGS. 3-5, can be achieved in piston 32.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed:

1. A piston for an internal combustion engine comprising:
    a piston skirt; and
    a piston crown attached to the piston skirt and defining a piston center axis, the piston crown having a bowl surface forming a combustion bowl, a rim surface forming an annular rim extending circumferentially around the combustion bowl, and a gallery surface exposed to a backside cooling gallery of the piston;
    the bowl surface includes an outer bowl surface that is concave to the combustion bowl, and forms a bowl profile that is varied circumferentially around the piston center axis, such that the bowl surface defines, within the combustion bowl, a plurality of bowl peak points and a plurality of bowl valley points;
    the gallery surface is concave to the combustion bowl and convex to the backside cooling gallery, and forms a gallery profile that is varied, congruously with the bowl profile, circumferentially around the piston center axis and defines, within the backside cooling gallery, a plurality of gallery peak points and a plurality of gallery valley points circumferentially aligned with the plurality of bowl peak points and the plurality of bowl valley points, respectively;
    a wall is formed between the bowl surface and the gallery surface and has a heat-dissipation wall thickness defined by the varied bowl profile and the varied gallery profile; and
    the heat-dissipation wall thickness is greater at circumferential locations of the plurality of bowl peak points and the plurality of valley peak points than at circumferential locations of the plurality of bowl valley points and the plurality of gallery valley points.

2. The piston of claim 1 wherein the bowl surface includes a center cone surface that is convex to the combustion bowl, and a floor surface, and the outer bowl surface extends between the floor surface and the annular rim.

3. The piston of claim 2 wherein:
the gallery surface extends from an inner wall surface to a roof surface, of the backside cooling gallery; and
each of the gallery surface, the inner wall surface, and the roof surface is circumferentially continuous around the piston center axis.

4. The piston of claim 3 wherein the gallery surface is continuously concave, in an axial aspect, from the inner wall surface to the roof surface.

5. The piston of claim 2 wherein the outer bowl surface forms radially inward bowl peaks including the plurality of bowl peak points, and radially outward bowl valleys including the plurality of bowl valley points and in an alternating arrangement with the radially inward bowl peaks.

6. The piston of claim 5 wherein:
each of the radially inward bowl peaks includes a single ridge extending between the floor surface and an edge of the combustion bowl; and
the radially inward bowl peaks are arranged in a radially symmetric pattern and a number of the radially inward bowl peaks is from 3 to 8.

7. A piston for an internal combustion engine comprising:
a piston body defining a piston center axis extending between a first axial piston body end and a second axial piston body end;
the first axial piston body end having a bowl surface forming a combustion bowl, a rim surface forming an annular rim extending circumferentially around the combustion bowl, and a gallery surface exposed to a backside cooling gallery of the piston;
the bowl surface includes an outer bowl surface that is concave to the combustion bowl, and forms a bowl profile that is varied circumferentially around the piston center axis, such that the bowl surface defines, within the combustion bowl, a plurality of bowl peak points and a plurality of bowl valley points;
the gallery surface is concave to the combustion bowl and convex to the backside cooling gallery, and forms a gallery profile that is varied circumferentially around the piston center axis, such that the gallery surface defines, within the backside cooling gallery, a plurality of gallery peak points and a plurality of gallery valley points circumferentially aligned with the plurality of bowl peak points and the plurality of bowl valley points, respectively;
a wall thickness is defined between the bowl surface and the gallery surface; and
the bowl profile is varied, circumferentially around the center axis, to a greater relative extent, and the gallery profile is varied, circumferentially around the center axis, to a lesser relative extent, such that the wall thickness is greater at circumferential locations of the plurality of bowl peak points and the plurality of valley peak points than at circumferential locations of the plurality of bowl valley points and the plurality of gallery valley points.

8. The piston of claim 7 wherein:
the gallery surface extends from an inner wall surface to a roof surface, of the backside cooling gallery; and
each of the gallery surface, the inner wall surface, and the roof surface is circumferentially continuous around the piston center axis.

9. The piston of claim 8 wherein the gallery surface is continuously concave, in an axial aspect, from the inner wall surface to the roof surface.

10. The piston of claim 7 wherein a wall is formed between the bowl surface and the gallery surface and has a heat-dissipation wall thickness defined by the varied bowl profile and the varied gallery profile.

11. The piston of claim 10 wherein the heat-dissipation wall thickness has a minimum value at a location that is axially between the roof surface and the inner wall surface, of the backside cooling gallery, and progressively increased values from the location of the minimum value to the roof surface and from the location of the minimum value to the inner wall surface.

12. The piston of claim 7 wherein the bowl profile is varied in a first periodic pattern, and the gallery profile is varied in a second periodic pattern that is in phase with the first periodic pattern.

13. The piston of claim 10 wherein the plurality of bowl peak points are circumferentially aligned with the plurality of gallery peak points.

14. The piston of claim 13 wherein the outer bowl surface forms radially inward bowl peaks including the plurality of bowl peak points, and radially outward bowl valleys including the plurality of bowl valley points.

15. The piston of claim 14 wherein:
the radially inward bowl peaks are arranged in a radially symmetric pattern and a number of the plurality of radially inward bowl peaks is from 3 to 8; and
each of the radially inward bowl peaks includes a single ridge extending between a floor surface of the bowl surface and an edge of the combustion bowl.

16. A method of making a piston for an internal combustion engine comprising:
forming, in a piston body defining a center axis, a combustion bowl and an annular rim extending circumferentially around the combustion bowl;
forming, in the piston body, a backside cooling gallery;
profiling the combustion bowl, circumferentially around the center axis, such that a bowl surface concave to the combustion bowl defines a plurality of bowl peak points within a plurality of bowl peaks and a plurality of bowl valley points within a plurality of bowl valleys;
the plurality of bowl peaks each having a lesser circumferential extent around the center axis and a rounded profile that is convex to the combustion bowl, and the plurality of bowl valleys each having a greater circumferential extent around the center axis and being located at high heat input locations of the piston body;
varying a bowl profile of the combustion bowl, circumferentially around the center axis, to a greater relative extent based on the profiling of the combustion bowl;
profiling the backside cooling gallery, circumferentially around the center axis, such that a gallery surface defines a plurality of gallery peak points and a plurality of gallery valley points circumferentially aligned with the plurality of bowl peak points and the plurality of bowl valley points, respectively; and
limiting hot spot formation at the high heat input locations of the piston body at least in part by:
shaping the gallery surface, in a circumferential aspect, such that a gallery profile formed by the gallery surface is congruous with a bowl profile formed by the bowl surface;

shaping the gallery surface, in an axial aspect, such that the gallery surface has a curvature that is concave to the combustion bowl and convex to the backside cooling gallery; and varying a wall thickness defined between the bowl surface and the gallery surface, circumferentially around the center axis, to a lesser relative extent based on the profiling of the backside cooling gallery, such that the wall thickness is greater at circumferential locations of the plurality of bowl peak points and the plurality of valley peak points than at circumferential locations of the plurality of bowl valley points and the plurality of gallery valley points.

17. The method of claim 16 wherein the shaping of the gallery surface includes shaping the gallery surface, in the axial aspect, such that the gallery surface is smoothly curved from an inner wall surface to a roof surface, of the backside cooling gallery, and forms no edges exposed within the backside cooling gallery.

18. The method of claim 17 wherein the profiling of the combustion bowl includes forming a plurality of bowl peaks each including a single ridge extending between a floor of the combustion bowl and an edge of the combustion bowl and including the bowl peak points.

* * * * *